US010519892B2

(12) United States Patent
Wundling et al.

(10) Patent No.: US 10,519,892 B2
(45) Date of Patent: Dec. 31, 2019

(54) METHOD FOR OPERATING AN INTERNAL COMBUSTION ENGINE

(71) Applicant: Robert Bosch GmbH, Stuttgart (DE)

(72) Inventors: Claus Wundling, Freiberg (DE);
Rainer Ecker, Kornwestheim (DE);
Thomas Kuhn, Heibronn (DE); Timm Hollmann, Benningen A.n. (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/060,201

(22) PCT Filed: Nov. 28, 2016

(86) PCT No.: PCT/EP2016/078964
§ 371 (c)(1),
(2) Date: Jun. 7, 2018

(87) PCT Pub. No.: WO2017/097615
PCT Pub. Date: Jun. 15, 2017

(65) Prior Publication Data
US 2018/0363585 A1 Dec. 20, 2018

(30) Foreign Application Priority Data
Dec. 10, 2015 (DE) .................. 10 2015 224 790

(51) Int. Cl.
*F02D 41/30* (2006.01)
*F02D 41/14* (2006.01)
(Continued)

(52) U.S. Cl.
CPC ..... *F02D 41/3094* (2013.01); *F02D 13/0261* (2013.01); *F02D 41/0007* (2013.01);
(Continued)

(58) Field of Classification Search
CPC ............. F02D 41/3094; F02D 41/0007; F02D 13/0261; F02D 41/345; F02D 41/1448;
(Continued)

(56) References Cited

FOREIGN PATENT DOCUMENTS

DE 102009028798 A1 2/2011
EP 2781726 A1 9/2014
(Continued)

OTHER PUBLICATIONS

International Search Report dated Feb. 8, 2017 of the corresponding International Application PCT/EP2016/078964 filed Nov. 28, 2016.

*Primary Examiner* — Xiao En Mo
(74) *Attorney, Agent, or Firm* — Norton Rose Fulbright US LLP; Gerard Messina

(57) ABSTRACT

In a method for operating an internal combustion engine with intake manifold injection and direct injection, a value of at least one parameter that is correlated with an exhaust gas of a combustion chamber of the internal combustion engine and that is influenced by purging of uncombusted fuel through the combustion chamber into the exhaust gas is ascertained, and, if it is concluded, based on the ascertained value of the at least one parameter, that uncombusted fuel is purged, at least one operating parameter for filling the combustion chamber is adjusted.

10 Claims, 3 Drawing Sheets

(51) Int. Cl.
  *F02D 41/34*   (2006.01)
  *F02D 13/02*   (2006.01)
  *F02D 41/00*   (2006.01)
(52) U.S. Cl.
  CPC ..... *F02D 41/1446* (2013.01); *F02D 41/1448* (2013.01); *F02D 41/345* (2013.01); *F02D 2200/0406* (2013.01)
(58) Field of Classification Search
  CPC ......... F02D 41/1446; F02D 2200/0406; F02D 41/34; Y02T 10/44; Y02T 10/18
  See application file for complete search history.

(56) References Cited

FOREIGN PATENT DOCUMENTS

| | | |
|---|---|---|
| EP | 2787203 A1 | 10/2014 |
| JP | 2005133632 A | 5/2005 |
| JP | 2008101540 A | 5/2008 |
| JP | 2014224461 A | 12/2014 |

METHOD FOR OPERATING AN INTERNAL COMBUSTION ENGINE

CROSS-REFERENCE TO RELATED APPLICATIONS

The present application is the national stage of International Pat. App. No. PCT/EP2016/078964 filed Nov. 28, 2016, and claims priority under 35 U.S.C. § 119 to DE 10 2015 224 790.2, filed in the Federal Republic of Germany on Dec. 10, 2015, the content of each of which are incorporated herein by reference in their entireties.

FIELD OF THE INVENTION

The present invention relates to a method, a processing unit, and a computer program for operating an internal combustion engine with intake manifold injection and direct injection.

BACKGROUND

One possible method for fuel injection in gasoline engines is intake manifold injection, which is being increasingly replaced by direct fuel injection. The latter method results in much better fuel distribution in the combustion chambers, and, thus, in an improved power yield with lower fuel consumption.

In addition, there are also gasoline engines with a combination of intake manifold injection and direct injection, a so-called dual system. This is advantageous in particular in light of increasingly stringent emission requirements and emission limits, since intake manifold injection, for example at medium load ranges, results in better emission values than does direct injection. In contrast, in the full load range, direct injection allows a reduction in so-called knocking, for example.

To improve a response characteristic of a turbocharger, within the scope of so-called "scavenging," an intake valve and an exhaust valve of a combustion chamber can be opened simultaneously to obtain higher flow values in the exhaust pipe and thus in the turbocharger. Such a method for an internal combustion engine with intake manifold operation is known from DE 10 2009 028 798 A1, for example.

A method is known from EP 2 781 726 A1, for example, for reducing, in a dual system, a flush rate of fuel during the simultaneous opening of an intake valve and an exhaust valve. For this purpose, a period of time during which both valves are open and a fuel quantity that is introduced via intake manifold injection are changed based on a fuel quantity that is introduced via direct injection.

A method is also known from EP 2 787 203 A1, for example, for reducing, in a dual system, a flush rate of fuel during the simultaneous opening of an intake valve and an exhaust valve. For this purpose, the injection times for both types of injection are set to a time after the exhaust valve has closed.

SUMMARY

According to an example embodiment of the present invention, a method is used for operating an internal combustion engine with intake manifold injection and direct injection. A value of at least one parameter that is correlated with an exhaust gas of a combustion chamber of the internal combustion engine and that is influenced by flushing of uncombusted fuel through the combustion chamber into the exhaust gas is ascertained. If it is concluded, based on the ascertained value of the at least one parameter, that uncombusted fuel is flushed through, at least one operating parameter for filling the combustion chamber is adjusted. The value of the at least one parameter that is correlated with the exhaust gas of the combustion chamber of the internal combustion engine can be ascertained in particular using a model and/or using at least one suitable sensor.

By simultaneously opening an intake valve and an exhaust valve of the combustion chamber, a response characteristic of a turbocharger can be improved due to the fact that, in particular at low rotational speeds, higher flow values can be obtained in the exhaust pipe and thus in the turbocharger. Depending on the exact introduction behavior of fuel into the combustion chamber, which includes not only an allocation between intake manifold injection and direct injection, but also injection times and valve opening times, the situation can arise that fuel that is initially introduced into the intake manifold via intake manifold injection does not reach the combustion chamber because the intake valve is still closed or has already reclosed. Fuel is thus deposited upstream or downstream in the intake manifold, and can be flushed from the intake manifold, through the combustion chamber, and into the exhaust pipe in a phase in which the intake valve and the exhaust valve are open at the same time, i.e., during the so-called scavenging. This means that uncombusted fuel passes into the exhaust gas, which can result, for example, in increased stress on components due to elevated exhaust gas temperatures, poor emission values, or also excessively high catalytic converter temperatures.

The provided method now makes use of the fact that uncombusted fuel that is flushed through the combustion chamber becomes apparent in various parameters of the exhaust gas itself or other parameters correlated with the exhaust gas. Flushed-through uncombusted fuel can thus be recognized, and operating parameters for filling the combustion chamber with fuel can be suitably adjusted, so that purging of uncombusted fuel is avoided or at least reduced, in that upstream or downstream deposition of fuel in the intake manifold is avoided or at least reduced. In this way, for example stress on components can be reduced, emission values can be improved, and excessively high catalytic converter temperatures can be avoided. However, the operation with intake manifold injection and direct injection, which is favorable with regard to emissions, can be at least partially maintained.

The at least one parameter that is correlated with an exhaust gas of the combustion chamber of the internal combustion engine preferably includes a temperature, a pressure and/or a mass flow of the exhaust gas, a lambda value, a rotational speed of a turbocharger that is operated with the aid of the exhaust gas, and/or an intake manifold pressure upstream from the throttle valve. For example, a temperature sensor in the exhaust pipe, a lambda sensor, or a tachometer or an intake manifold pressure sensor can be used for ascertaining the value. Additionally or alternatively, however, a model suitable for computation, for example, in particular at the temperature of the exhaust gas, is conceivable. When fuel floods over into the exhaust tract, exothermic post-reactions (so-called "post-combustions") occur there. This results in an enthalpy increase (pressure, temperature) of the exhaust gas. This in turn increases the exhaust gas turbocharger rotational speed. This increase in rotational speed can be ascertained either directly via an exhaust gas turbocharger rotational speed sensor, or indirectly via an increase in the intake manifold pressure upstream from the throttle valve (i.e., downstream from the compressor outlet). This indirect determination of the increase in rotational speed would be much more cost-effective than via the rotational speed sensor, in particular since a sensor for the intake manifold pressure is usually already present anyway. All of the stated parameters are influenced by purging of fuel, and thus allow purging to be easily recognized. It is understood that, for example, ascertaining only one of these parameters may be sufficient. However, more reliable recognition of the purging can take place by ascertaining multiple such parameters and, for example, also comparing them to one another.

In order to draw conclusions concerning uncombusted fuel in the exhaust gas based on such parameters, a distinction can be made between static operation and dynamic operation. One assumption in static operation, for example with constant load and rotational speed of the internal combustion engine, is that large fuel pre-deposition effects inadvertently occur upstream from the intake valves. This means that at the end of the intake stroke, the intake valve closes and fuel from the intake manifold injection deposits in liquid form; i.e., forms a wall film and/or fuel from the intake manifold injection and/or from the wall film deposits in gaseous form upstream from the intake valves. With the next intake stroke, the liquid or gaseous fuel passes into the cylinders via the open intake valves. The liquid input into the combustion chamber can be computed via the intake manifold injection itself and a wall film model. However, the gaseous input into the combustion chamber skews the cylinder filling with air, since the pre-deposited fuel vapor displaces the air. As a result, the subsequent combustion is too rich, or takes place with an air deficit, which can be measured via a lambda value less than one. In addition, the rich combustion results in a lowering of the combustion temperature, and thus a lowering of the exhaust gas temperature. This in turn results in a lower exhaust gas flow, which can be measured directly via a reduced exhaust gas turbocharger rotational speed, or alternatively, indirectly via a lowering of the intake manifold pressure.

During dynamic operation, scavenging can make a significant contribution to the increase in torque at low rotational speeds of the internal combustion engine. Intake valves and exhaust valves are set in such a way that a valve overlap results (the intake valve opens before the exhaust valve closes, in particular during the discharge stroke shortly before top dead center). Due to the (dynamic) pressure drop between the air duct and the exhaust tract, the combustion chamber is filled with fresh air, and at the same time the residual gas remaining from the most recent combustion in the combustion chamber is flushed out. The improved filling of the cylinder with fresh air allows a higher torque, since on the one hand a larger fuel quantity can be combusted, and on the other hand the low residual exhaust share improves the knocking behavior of the internal combustion engine. The resulting higher mass flow across the turbine of the turbocharger results in a higher back pressure, and thus, in greater turbine power and higher charge pressure. The higher charge pressure can in turn be utilized for increasing the torque, which intensifies this function itself. The exhaust gas temperature, which drops due to the dilution with fresh air, limits the effectiveness of the function at high scavenging rates. In addition, the maximum scavenging air quantity must be limited to not interfere with the exhaust gas aftertreatment. Four-cylinder engines with a single-flow turbine generally require short opening durations of the exhaust valves in order to temporally decouple pressure pulses from the scavenging phases of the neighboring cylinders due to opening of the exhaust valves. A driving scavenging pressure ratio of fresh air with respect to the exhaust gas side during the valve overlap phase is achievable in this way. In contrast, in three-cylinder engines the opening durations of the exhaust valves are generally not limiting. Dual-flow turbines are also possible as an alternative to the short exhaust phase. In all configurations, direct injection into the combustion chamber is beneficial for avoiding fuel scavenging losses during the valve overlap phase.

During purging, evaporated fuel pre-depositions upstream from the intake valves during scavenging result in fuel input into the combustion chamber and into the exhaust gas, resulting in a temperature increase (instead of a temperature decrease) in the exhaust gas. In addition, they result in a fairly large dynamic pressure drop from the intake valve side to the exhaust valve side due to fuel evaporation, and thus result in a pressure increase on the intake valve side, resulting in a larger scavenging quantity than intended, which interferes with the exhaust gas aftertreatment (change in the lambda value and/or the exhaust gas temperature). Evaporated fuel pre-depositions also result in richer combustion, since the filling of the cylinder with intake air additionally contains fuel from the previous firing cycle.

Liquid fuel pre-depositions upstream from the intake valves during scavenging can pass into the combustion chamber with the next intake stroke and opening of the intake valves, and can wet cylinder walls, piston surfaces, injectors, and spark plugs. If the quantities of liquid fuel cannot be evaporated and combusted at the right time during the main combustion, formation of deposits and soot results. However, if the liquid fuel evaporates from the wetted components at the right time, this results in cooling of the wetted components, and also increases the risk of deposit formation. In other respects, the same effects with regard to richer lambda and lower exhaust gas temperature occur as explained in conjunction with evaporated fuel pre-depositions.

The at least one operating parameter advantageously includes a fuel quantity to be introduced into the intake manifold via intake manifold injection, an injection duration, and/or an injection start. Thus, for example, the pre-deposited fuel quantity can be reduced by reducing the fuel quantity to be introduced via intake manifold injection. Likewise, for example the injection start can be adjusted in order to reduce the pre- or post-deposited fuel quantity. Purging can thus be avoided or at least reduced in a particularly simple manner.

It is advantageous when the at least one operating parameter for the filling of the combustion chamber is adjusted, taking into account an instantaneous value of at least one further operating parameter for the filling of the combustion chamber. The at least one further operating parameter can include in particular an injection duration and/or an injection start of the intake manifold injection and/or at least one control parameter of the intake valve and/or of an exhaust valve of the combustion chamber. The at least one control parameter of the intake valve and/or of the exhaust valve in turn can in particular include in each case a setting of a valve lift and/or an opening point in time and/or a closing point in time. This is possible in particular when an internal combustion engine with a variable valve train assembly is used, with the aid of which the opening and closing points in time as well as the valve lifts of the valves may be individually set. Examples of suitable variable valve train assemblies here include electric or electromechanical valve train assemblies or hydraulic valve train assemblies, which are known per se. A more accurate adjustment of the operating parameters to be adjusted can take place by taking into account one or multiple further operating parameters in this way. In particular, an adjustment can also thus be made as a function of an instantaneous operating situation of the internal combustion engine, for example an instantaneous load requirement, that affects the operating parameters.

During the adjustment of the at least one operating parameter, if it is ascertained that a required fuel quantity to be introduced into the combustion chamber via intake manifold injection is not completely introducible into the combustion chamber via manifold injection, the at least one operating parameter preferably includes a fuel quantity which is to be introduced into the combustion chamber via direct injection, and which covers or compensates for at least the portion that is not introducible into the combustion chamber via intake manifold injection. If, for example, as the result of a high load requirement it is necessary for a very large fuel quantity to be metered via intake manifold injection, which, however, would unavoidably result in pre- or post-deposition of fuel in the intake manifold, a portion of the fuel quantity to be metered via intake manifold injection can be introduced into the combustion chamber via direct injection instead of via intake manifold injection. It is also conceivable for not just a portion, but, as needed, even the entire fuel quantity that is to be metered via intake manifold injection, to be transferred to direct injection. This is easily possible due to the flexibility in a dual system, so that on the one hand the required fuel quantity is introduced into the combustion chamber, and on the other hand pre- or post-deposition of fuel is still avoided.

The at least one operating parameter is advantageously adjusted taking into account the ascertained value of the at least one parameter. The operating parameters can be adjusted more accurately by ascertaining the quantity of pre- or post-deposited or flushed-through fuel based on the ascertained value.

It is advantageous when the at least one operating parameter is adjusted taking into account at least one associated stored value. Thus, for example, within the scope of data entry or an application, or for test trials, values for the operating parameters to be adjusted, can be ascertained for which a pre- or post-deposition of fuel is reliably avoided. These values can be stored, for example, in a characteristic map or the like for various further operating parameters and/or operating conditions of the internal combustion engine. If purging of fuel is now recognized, the stored values for the operating parameters can be set so that a pre- or post-deposition of fuel is avoided.

A processing unit according to the present invention, for example a control unit, in particular an engine control unit, of a motor vehicle, is configured, in particular by programming, for carrying out a method according to the present invention.

The implementation of the method in the form of a computer program is also advantageous, since this entails particularly low costs, in particular when a control unit to be employed is also used for further tasks, and therefore is present anyway. Suitable data media for providing the computer program are in particular magnetic, optical, and electric memories, for example hard disks, flash memories, EEPROMs, DVDs, and others. Downloading a program via computer networks (Internet, Intranet, etc.) is also possible.

Further advantages and embodiments of the present invention result from the description and the appended drawings.

The present invention is schematically illustrated based on one exemplary embodiment in the drawings, and is described below with reference to the drawings.

DETAILED DESCRIPTION

Figure 1A:
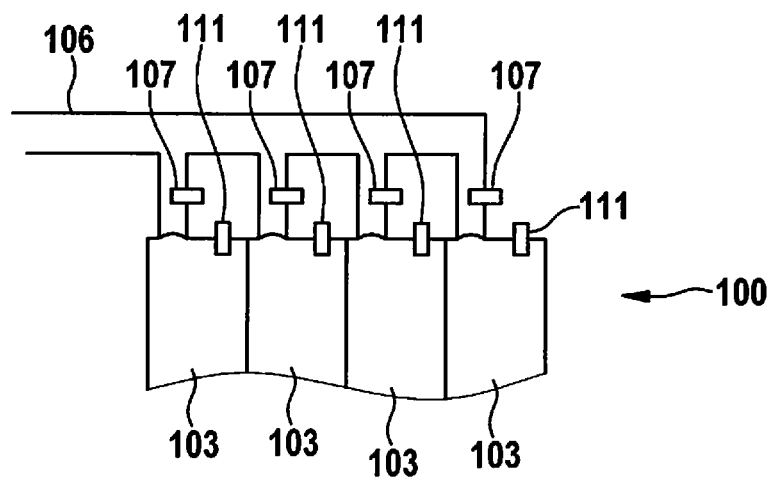
FIGS. 1a and 1b schematically show two internal combustion engines that can be used for a method according to example embodiments of the present invention.

FIG. 1a schematically shows in a simplified manner an internal combustion engine 100 that can be used for a method according to the present invention. As an example, internal combustion engine 100 includes four combustion chambers 103 and an intake manifold 106 that is connected to each of combustion chambers 103.

For each combustion chamber 103, intake manifold 106 includes a fuel injector 107 that is situated just upstream from the combustion chamber in the particular section of the intake manifold. Fuel injectors 107 are thus used for intake manifold injection. In addition, each combustion chamber 103 includes a fuel injector 111 for direct injection.

Figure 1B:
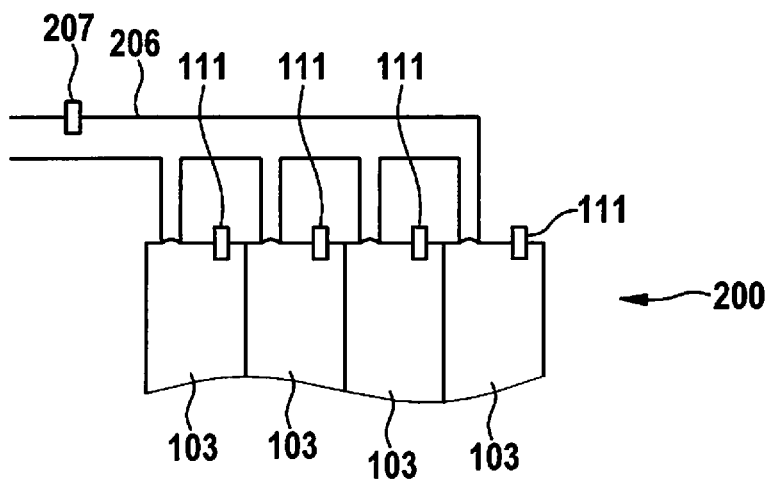

FIG. 1b schematically shows in a simplified manner another internal combustion engine 200 that can be used for a method according to the present invention. As an example, internal combustion engine 100 includes four combustion chambers 103 and an intake manifold 206 that is connected to each of combustion chambers 103.

Intake manifold 206 includes a shared fuel injector 207 for all combustion chambers 103, which is situated in the intake manifold, for example just downstream from a throttle valve, not shown here. First fuel injector 207 is thus used for intake manifold injection. In addition, each combustion chamber 103 includes a fuel injector 111 for direct injection.

Both internal combustion engines 100 and 200 shown thus include a so-called dual system, i.e., intake manifold injection and direct injection. The difference lies solely in the type of intake manifold injection. While the intake manifold injection shown in FIG. 1a, for example, allows individual fuel metering for each combustion chamber, which can be used for high-quality internal combustion engines, for example, the intake manifold injection shown in FIG. 1b has a simpler design and control system. The two internal combustion engines shown can in particular be gasoline engines.

Figure 2:
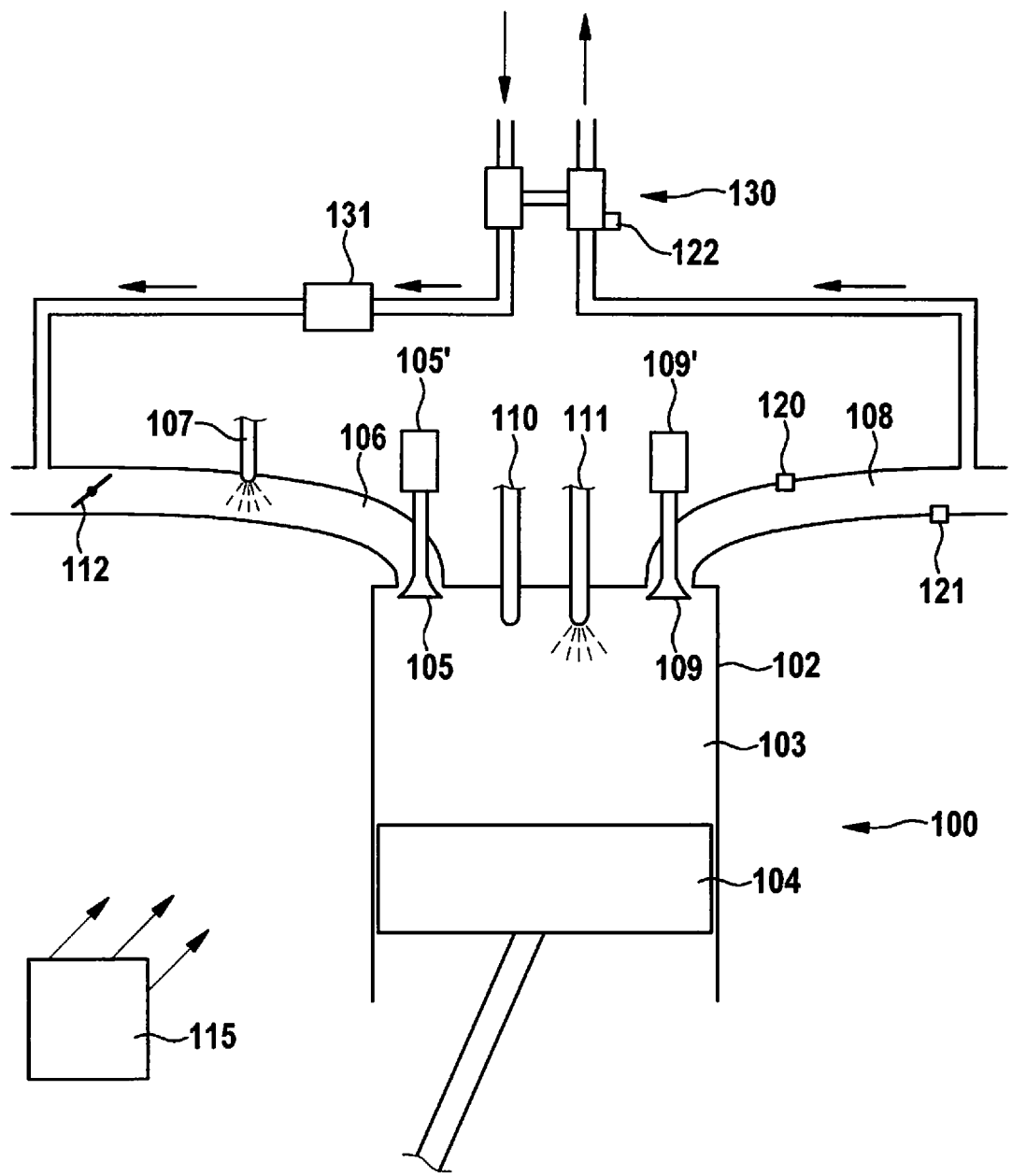
FIG. 2 schematically shows a cylinder of an internal combustion engine that can be used for a method according to an example embodiment of the present invention.

FIG. 2 schematically illustrates a cylinder 102 of internal combustion engine 100 in a simplified manner, but in more detail than in FIG. 1a. Cylinder 102 includes a combustion chamber 103 that is increased or decreased in size by movement of a piston 104. The present internal combustion engine may in particular be a gasoline engine.

Cylinder 102 includes an intake valve 105 for admitting air or a fuel-air mixture into combustion chamber 103. The air is supplied via intake manifold 106 of an air supply system at which fuel injector 107 is situated. Aspirated air is admitted into combustion chamber 103 of cylinder 102 via intake valve 105. A throttle valve 112 in the air supply system is used for setting the required air mass flow into cylinder 102.

The internal combustion engine can be operated in the course of an intake manifold injection. With the aid of fuel injector 107, fuel is injected into intake manifold 106 in the course of this intake manifold injection, so that an air-fuel mixture forms there which is admitted into combustion chamber 103 of cylinder 102 via intake valve 105.

The internal combustion engine can also be operated in the course of a direct injection. For this purpose, fuel injector 111 is mounted on cylinder 102 in order to inject fuel directly into combustion chamber 103. During this direct injection, the air-fuel mixture required for the combustion is formed directly in combustion chamber 103 of cylinder 102.

Cylinder 102 is also provided with an ignition device 110 for generating an ignition spark in order to initiate a combustion in combustion chamber 103.

After a combustion, combustion exhaust gases are discharged from cylinder 102 via an exhaust pipe 108. The discharge takes place as a function of the opening of an exhaust valve 109 that is likewise situated on cylinder 102. Intake valves and exhaust valves 105, 109 are opened and closed in order to carry out a four-stroke operation of internal combustion engine 100 in a known manner.

An intake valve train assembly 105' is provided for intake valve 105, and an exhaust valve train assembly 109' is provided for exhaust valve 109. These valve train assemblies provide a variable valve train assembly with which the opening and closing points in time as well as the valve lifts of the valves can be individually set. The valve train assemblies can have an electromechanical or hydraulic design, for example. The adjustment of the times and of the valve lift can take place continuously or in stages, for example. It is understood that the valves of the remaining combustion chambers or cylinders, shown in FIGS. 1 and 2, for example, likewise include such valve train assemblies.

In addition, a turbocharger 130 is provided, into which exhaust gas that is branched off from exhaust pipe 108 is supplied, for example in order to drive a turbine at that location. In turbocharger 130, this turbine in turn drives a further turbine that compresses aspirated fresh air and conducts it to intake manifold 107 via a charge air cooler 131, for example. An elevated pressure m can ay thus be provided in the intake manifold.

A temperature sensor 120 for detecting the temperature of the exhaust gas, a lambda sensor 121 in the exhaust pipe 108, and a tachometer 122 for detecting the rotational speed of turbocharger 130 are also provided.

Internal combustion engine 100 can be operated with direct injection, with intake manifold injection, or in a mixed operation. This allows the particular optimal operating mode for operating internal combustion engine 100 to be selected as a function of the instantaneous operating point. Thus, internal combustion engine 100 can be operated in an intake manifold injection mode, for example, when it is operated at low rotational speed and low load, and can be operated in a direct injection mode when it is operated at high rotational speed and high load. However, over a large operating range it is meaningful to operate internal combustion engine 100 in a mixed mode in which the fuel quantity to be supplied to combustion chamber 103 is supplied partly by intake manifold injection and partly by direct injection.

In addition, a processing unit that is designed as a control unit 115 is provided for controlling internal combustion engine 100. Control unit 115 can operate internal combustion engine 100 via direct injection, intake manifold injection, or mixed operation. In addition, control unit 115 can also control valve train assemblies 105' and 109' and detect values from temperature sensor 120, from lambda sensor 121, and from tachometer 122. Control unit 115 can also control turbocharger 120, for example.

The operating principle of internal combustion engine 100, explained in greater detail with reference to FIG. 2, can also be transferred to internal combustion engine 200 according to FIG. 1*b*, the only difference being that only one shared fuel injector is provided for all combustion chambers or cylinders. Thus, for an intake manifold injection or for a mixed operation, the single fuel injector in the intake manifold is continually controlled.

Figure 3:
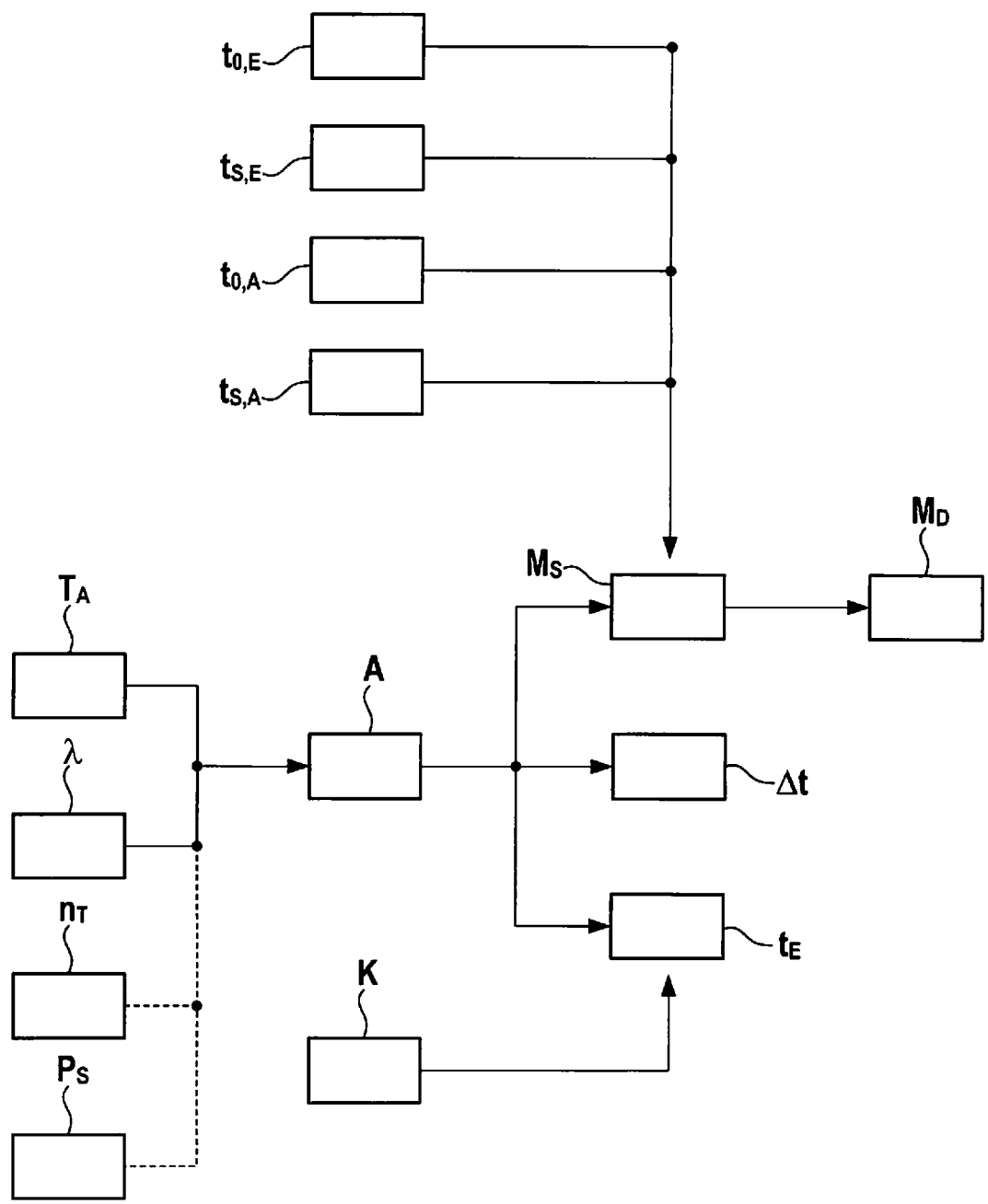
FIG. 3 schematically shows a sequence of a method according to an example embodiment of the present invention.

FIG. 3 schematically illustrates a sequence of a method according to the present invention in one preferred specific embodiment. Temperature $T_A$ of the exhaust gas, for example, is initially ascertained with the aid of the temperature sensor, and lambda value $\lambda$ is ascertained with the aid of the lambda sensor. As an alternative or in addition to the ascertainment of the values with the aid of the sensors, suitable models for estimation and/or computation can also be used. An additional or alternative ascertainment of, for example, intake manifold pressure $P_S$ and/or of a rotational speed $n_T$ of a turbocharger that is operated with the aid of the exhaust gas is possible, as indicated by dashed lines.

A decision is now made in an evaluation step A, based on one or more of the ascertained values of temperature $T_A$ of the exhaust gas, of lambda value $\lambda$, of intake manifold pressure $P_S$, and of rotational speed $n_T$, as to whether purging of uncombusted fuel from the intake manifold, through the combustion chamber, and into the exhaust gas in the exhaust pipe, is present. Depending on the reliability of the ascertained individual values and/or their accuracy, the values can be used, for example together with one another, for the decision, or, for example, only for mutual plausibility checking. Reference is made to the above discussion for a more detailed explanation of options for drawing conclusions concerning uncombusted fuel.

If purging of uncombusted fuel is concluded in evaluation step A, for example fuel quantity $M_S$ that is to be introduced into the combustion chamber via intake manifold injection, injection point in time $t_E$, and injection duration $\Delta t$ of the intake manifold injection can be adjusted as operating parameters.

Thus, fuel quantity $M_S$ that is to be introduced into the combustion chamber via intake manifold injection can be reduced, for example, while at the same time, injection point in time $t_E$ can be shifted toward an earlier time and shortened. Uncombusted fuel can thus be prevented from being purged. It is understood that, for example, only one or two of the stated operating parameters can be adjusted if this appears, or is, sufficient to avoid the pre- or post-deposition of fuel.

The stated operating parameters can be adjusted or set, for example, taking into account a characteristic map K of suitable values for the operating parameters in question, for which it is known that no purging of uncombusted fuel and no pre- or post-deposition of fuel in the intake manifold occurs.

For the values used from characteristic map K, a distinction can be made, for example according to different values for different operating points of the internal combustion engine, for example with regard to the load requirement, that can have an effect on the operating parameters to be set.

In addition, when fuel quantity $M_S$, which is to be introduced into the combustion chamber via intake manifold injection, is reduced, fuel quantity $M_D$, which is to be introduced into the combustion chamber via direct injection, can be correspondingly increased. In this way, the overall desired fuel quantity is introduced into the combustion chamber, despite the avoidance of pre- or post-deposited fuel.

In addition, further operating parameters, for example opening point in time $t_{O,E}$ and closing point in time $t_{S,E}$ of the intake valve as well as opening point in time $t_{O,A}$ and closing point in time $t_{S,A}$ of the exhaust valve, with their instantaneous values can be taken into account in adjusting the operating parameters. A more targeted adjustment of the operating parameters, for example, can take place in this way. Thus, for example, by adjusting the injection start and the injection duration, the end of the injection can be adjusted to a closing point in time of the intake valve in a targeted manner.

What is claimed is:

1. A method for operating an internal combustion engine with intake manifold injection and direct injection, the method comprising:
    ascertaining a value of at least one parameter that is correlated with an exhaust gas of a combustion chamber of the internal combustion engine and that is influenced by purging of uncombusted fuel through the combustion chamber into the exhaust gas;
    responsive to concluding, based on the ascertained value of the at least one parameter, that uncombusted fuel is purged, adjusting at least one operating parameter for filling the combustion chamber in order to avoid upstream or downstream deposition of fuel in an intake manifold, wherein the at least one operating parameter includes a fuel quantity to be introduced into the intake manifold via intake manifold injection and an injection duration of the intake manifold injection; and
    responsive to ascertaining, during the adjustment of the at least one operating parameter, that a fuel quantity to be introduced into the combustion chamber is not completely introducible into the combustion chamber via the intake manifold injection, setting a fuel quantity to be introduced into the combustion chamber via direct injection, to covers at least a portion of the fuel quantity to be introduced into the combustion chamber that is not introducible into the combustion chamber via the intake manifold injection.

2. The method of claim 1, wherein the at least one parameter that is correlated with an exhaust gas of the combustion chamber of the internal combustion engine includes at least one of a temperature, a pressure of the exhaust gas, a mass flow of the exhaust gas, a lambda value, a rotational speed of a turbocharger that is operated with the aid of the exhaust gas, and an intake manifold pressure.

3. The method of claim 1, wherein the adjusting is performed taking into account an instantaneous value of at least one further operating parameter for a filling of the combustion chamber.

4. The method of claim 3, wherein the at least one further operating parameter includes at least one of an injection duration of the intake manifold injection, an injection start of the intake manifold injection, at least one control parameter of the intake valve of the combustion chamber, and at least one control parameter of an exhaust valve of the combustion chamber.

5. The method of claim 3, wherein the at least one further operating parameter includes a setting of at least one of a valve lift, an opening point in time, and a closing point in time of at least one of an intake valve and an exhaust valve of the combustion chamber.

6. The method of claim 1, wherein the adjusting is performed based on at least one ascertained stored value.

7. The method of claim 1, wherein the ascertainment is performed using at a model.

8. The method of claim 1, wherein the ascertainment is performed using at least one suitable sensor.

9. A control unit for operating an internal combustion engine with intake manifold injection and direct injection, the control unit comprising:
    a processor, wherein the processor is configured to:
        ascertain a value of at least one parameter that is correlated with an exhaust gas of a combustion chamber of the internal combustion engine and that is influenced by purging of uncombusted fuel through the combustion chamber into the exhaust gas;
        responsive to concluding, based on the ascertained value of the at least one parameter, that uncombusted fuel is purged, adjust at least one operating parameter for filling the combustion chamber in order to avoid upstream or downstream deposition of fuel in an intake manifold, wherein the at least one operating parameter includes a fuel quantity to be introduced into the intake manifold via intake manifold injection and an injection duration of the intake manifold injection; and
        responsive to ascertaining, during the adjustment of the at least one operating parameter, that a fuel quantity to be introduced into the combustion chamber is not completely introducible into the combustion chamber via the intake manifold injection, set a fuel quantity to be introduced into the combustion chamber via direct injection, to covers at least a portion of the fuel quantity to be introduced into the combustion chamber that is not introducible into the combustion chamber via the intake manifold injection.

10. A non-transitory computer-readable medium on which are stored instructions that are executable by a processor and that, when executed by the processor, cause the processor to method for operating an internal combustion engine with intake manifold injection and direct injection, the method comprising:
    ascertaining a value of at least one parameter that is correlated with an exhaust gas of a combustion chamber of the internal combustion engine and that is influenced by purging of uncombusted fuel through the combustion chamber into the exhaust gas;
    responsive to concluding, based on the ascertained value of the at least one parameter, that uncombusted fuel is purged, adjusting at least one operating parameter for filling the combustion chamber in order to avoid upstream or downstream deposition of fuel in an intake manifold, wherein the at least one operating parameter includes a fuel quantity to be introduced into the intake manifold via intake manifold injection and an injection duration of the intake manifold injection; and
    responsive to ascertaining, during the adjustment of the at least one operating parameter, that a fuel quantity to be introduced into the combustion chamber is not completely introducible into the combustion chamber via the intake manifold injection, setting a fuel quantity to be introduced into the combustion chamber via direct injection, to covers at least a portion of the fuel quantity to be introduced into the combustion chamber that is not introducible into the combustion chamber via the intake manifold injection.

* * * * *